United States Patent
Suvakovic

(10) Patent No.: US 8,521,033 B2
(45) Date of Patent: Aug. 27, 2013

(54) SYSTEM AND METHOD FOR ENERGY-EFFICIENT OPERATION OF OPTICAL NETWORK UNITS BASED ON SCHEDULED PAYLOAD RECEPTION

(75) Inventor: Dusan Suvakovic, Pleasanton, CA (US)

(73) Assignee: Alcatel Lucent, Paris (FR)

(*) Notice: Subject to any disclaimer, the term of this patent is extended or adjusted under 35 U.S.C. 154(b) by 620 days.

(21) Appl. No.: 12/482,412

(22) Filed: Jun. 10, 2009

(65) Prior Publication Data

US 2010/0316387 A1    Dec. 16, 2010

(51) Int. Cl.
*H04J 14/00* (2006.01)

(52) U.S. Cl.
USPC .......... 398/171; 398/166; 398/66; 398/99; 398/71

(58) Field of Classification Search
USPC .......................................... 398/66
See application file for complete search history.

(56) References Cited

U.S. PATENT DOCUMENTS

| 7,660,309 | B2* | 2/2010 | Ikeda et al. | 370/392 |
| 2004/0001718 | A1* | 1/2004 | Matthews et al. | 398/98 |
| 2006/0029389 | A1 | 2/2006 | Cleary et al. | |
| 2008/0195881 | A1 | 8/2008 | Bernard et al. | |
| 2009/0263127 | A1* | 10/2009 | Haran et al. | 398/38 |
| 2009/0285581 | A1* | 11/2009 | Kim et al. | 398/140 |

FOREIGN PATENT DOCUMENTS

| EP | 1801984 A1 | 6/2007 |
| WO | WO2009054581 A1 | 4/2009 |

* cited by examiner

*Primary Examiner* — Danny Leung
(74) *Attorney, Agent, or Firm* — RGIP LLC

(57) ABSTRACT

In a passive optical network, power consumption of the ONU can be reduced by communicating a transmission schedule from the OLT to the ONU that indicates time slots in which the ONU is scheduled to receive payload transmissions from the OLT. Components of the ONU that would normally operate continuously, including processing payloads addressed to other ONUs, are placed in a reduced power state outside of the ONU's allocated time slots.

11 Claims, 11 Drawing Sheets

SYSTEM AND METHOD FOR ENERGY-EFFICIENT OPERATION OF OPTICAL NETWORK UNITS BASED ON SCHEDULED PAYLOAD RECEPTION

FIELD OF THE INVENTION

This disclosure relates to a Passive Optical Network (PON) and to methods for reducing power consumption in a PON.

BACKGROUND OF THE INVENTION

A passive optical network (PON) is a flexible access network that is capable of providing a range of broadband and narrow-band services for business and residential customers. The underlying equipment is considered to be relatively inexpensive for network operators because they do not require any active equipment or power supplies between the operator's central office (CO) and customer's premises (CP). As shown in the PON 10 of FIG. 1, downstream PON traffic is destined from the Optical Line Termination (OLT) 12 residing in the CO towards a number of network terminals 16, termed Optical Network Termination (ONT) devices or Optical Network Units, residing on the CP via an optical splitter 14.

Most PON networks and all major PON standards use non-modulated, baseband Non-Return to Zero (NRZ) signaling over the optical fiber: Time Division Multiplexing (TDM) in the downstream direction and Time Division Multiple Access (TDMA) in the upstream. So far, such signaling has been proven as the most cost-effective choice.

The increase in the TDM/TDMA PON bandwidth is achieved simply by speeding up the downstream and upstream baseband signaling. The evolution of the PON systems and standards has seen a steady increase of PON bit rate ranging from the initial 155 Mb/s in APON in the mid-1990s, to 1.25 Gb/s in Gigabit-capable PON (GPON) [ITU-T G.984] and Ethernet PON (EPON) [IEEE 802.3ah] of mid-2000s, up to 10 Gb/s specified in the IEEE 802.3av (10GEPON) [1-3] and ITU-T 10G GPON standards as of year 2009. Whereas this trend has been delivering ever-higher bandwidth to the subscribers, it has also been increasing the ONU energy consumption proportionally to the bit rate.

ONU energy consumption is important for two reasons. First, given that key communication services such as residential phone lines and internet access depend on the ONU, it is necessary to ensure its long operation when powered by a battery during utility power outages. To that end, it is desirable to minimize the operational energy consumption of the ONU. Secondly, ONU energy efficiency (and its carbon footprint) is becoming increasingly important in the context of environmental concerns and rational use of energy resources.

Patterns of ONU energy consumption in processing upstream and downstream traffic are notably different. The upstream activity is bursty and confined in time-slots in which the ONU transmits upstream data, whereas its downstream activity is continuous. The energy consumption of ONU upstream and downstream processing units, if normalized per unit of subscriber traffic, turns out to be considerably higher for the downstream traffic than for the upstream. This fact is attributable to the nature of GPON and EPON protocols, which requires the ONU physical (PHY) and most of the media access control (MAC) layer hardware to be turned on and continuously receive downstream traffic. Downstream payload not destined to the subscriber associated with the particular ONU is identified and dropped by the ONU, but only after it causes significant amount of energy dissipation.

Proposed solutions for ONU low-power operation have been limited to reduction of ONU functionality during battery powered operation and scheduled inactivity (sleep) intervals.

What is required is a system and method for reducing the ONU energy (and power) consumption during its normal operation.

SUMMARY OF THE INVENTION

In one aspect of the disclosure, there is provided a method for operating an optical network unit comprising receiving transmission timing information into the optical network unit, the transmission timing information indicating one or more time slots allocated to the optical network unit for payload transmissions addressed to the optical network unit. The method also comprises placing one or more components of the optical network unit into a reduced power state outside of the one or more time slots.

In one aspect of the disclosure, there is provided a passive optical network comprising at least one optical line termination and a plurality of optical network units in communication with the at least one optical line termination; The at least one optical line termination is configured to communicate a transmission schedule to the plurality of optical network units and transmit payloads to the plurality of optical network units in accordance with the transmission schedule. At least one of the plurality of optical network units is configured to receive the transmission schedule from the at least one optical line termination, and operate in a low power mode during periods indicated in the transmission schedule during which the respective optical network unit is not scheduled to receive payload transmission.

In one aspect of the disclosure, there is provided an optical line termination for a passive optical network that is configured to communicate a transmission schedule to a plurality of optical network units, the transmission schedule indicating a plurality of time slots allocated to the plurality of optical network units for payload transmissions. The optical line termination is also configured to transmit payloads to the plurality of optical network units in accordance with the transmission schedule.

BRIEF DESCRIPTION OF THE DRAWINGS

Reference will now be made, by way of example only, to specific embodiments and to the accompanying drawings in which.

DETAILED DESCRIPTION OF THE INVENTION

Embodiments of the present disclosure enable significant reduction in the ONU energy consumption without degradation of the system functionality or performance. This may be achieved by means of a change in the PON protocol. The embodiments to be described below are equally applicable to all PON systems and standards featuring baseband signaling and TDM operation in the downstream direction. Several different embodiments are presented, illustrating the applicability in the GPON and EPON family of standards.

TDM-based PON downstream protocols require all ONUs to receive and process all downstream traffic for the purpose of meeting the following requirements: 1) maintaining clock synchronization (keeping local clock synchronized to the OLT transmit clock), 2) maintaining Forward Error Correction (FEC) synchronization (keeping track of the FEC block alignment), 3) maintaining payload synchronization (keeping track of start positions of subsequent payload units (GPON Encapsulation Method (GEM) frames in GPON or Ethernet frames in EPON) and 4) receive all packets whose destination addresses match a local ONU address.

In one embodiment, the OLT notifies each ONU on the same PON, when to receive downstream traffic, while allowing the ONU's FEC and MAC layer to enter an energy-saving state, by suspending processing of downstream traffic that is not being sent to one of its own addresses. This is achieved without compromising the ONU performance and functionality in terms of requirements 1), 2), 3) and 4). At the same time, the operational power consumption of the ONU is reduced significantly.

Figure 1:
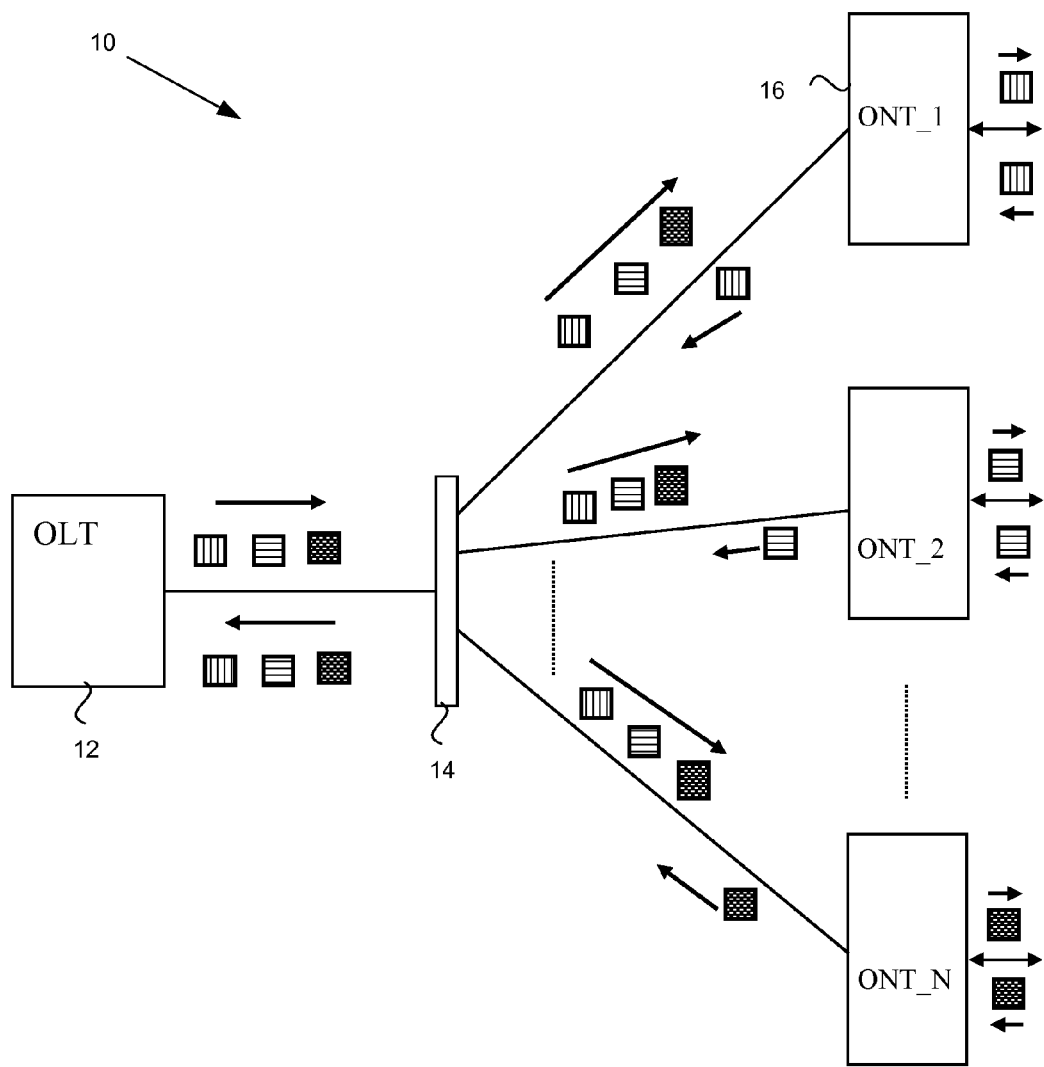
FIG. 1 illustrates a passive optical network.
Figure 2:
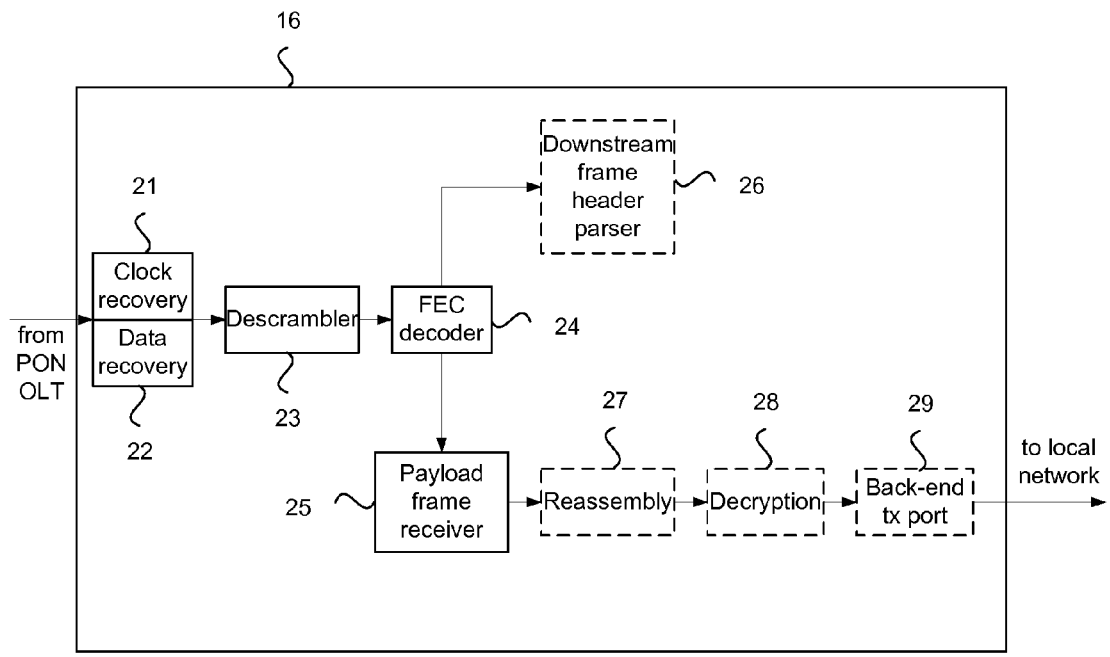
FIG. 2 illustrates an optical network unit.

The internal architecture of an ONU receiver 16 is shown in FIG. 2. A number of receiver components receive and process downstream traffic continuously, including processing payloads addressed to other optical network units. These components, shown with solid outline, include: clock recovery PLL 21, data recovery module 22, descrambler 23, FEC decoder 24 and payload frame receiver 25. The other components, shown in broken outline, including the downstream frame header parser 26, reassembly module 27, decryption module 28 and back-end transmission port 29, are exercised only when the destination address of the payload frame is identified as one belonging to this ONU. Given that the majority of payload frames received by the ONU are not sent to its own address, such frames will be dropped in the frame receiver. However, before this happens, the reception of such frames will have caused substantial energy consumption by all blocks drawn in the solid line. The embodiments to be described below enable the ONU to put all the components drawn in the solid line, except the clock recovery 21, in the energy-saving state for the duration of transmission of downstream payload not destined to the particular ONU. An implementation of the energy-saving state may include well known low-power digital design techniques such as clock gating as well as use of low-leakage transistor switches etc.

In order that an ONU 16 can know when it will receive payload units for its own address, the protocol used between the OLT 12 and the ONUs 16 may define that the OLT 12 sends certain up-front information about payload transmission times (IPTT). This information is used by each ONU 16 in order to receive all downstream payload units sent to its own address, while avoiding reception of other downstream payload.

Figure 3:
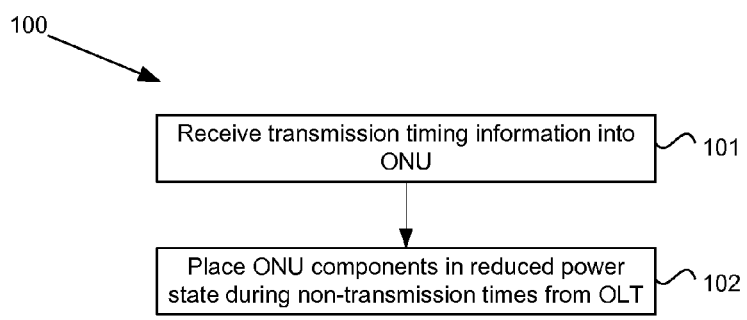
FIG. 3 illustrates a method for operating an optical network unit.

The ONU 16 operates as shown in the flowchart 100 of FIG. 3. At step 101, the ONU 16 receives the IPTT which may indicate time slots during which the ONU is scheduled to receive payload transmissions from the OLT 12. The ONU then places components of the ONU 16 into a reduced power state during periods outside of the scheduled time slots (step 102).

The IPTT content and format and the corresponding rules controlling the ONU behavior may be embodied in a variety of ways. Further, a variety of time references may be used in the respective IPTTs.

IPTT Content Options:

Content Option 1 (C1)

The OLT sends the exact schedule of its downstream transmissions. The schedule includes the information, for each ONU, about the start and duration time of each time slot in which payload will be sent to that particular ONU. Upon reception of this information, each ONU operates in a receiving state during its own payload time slots to receive downstream traffic and keeps the data recovery module 22, descrambler 23, FEC decoder 24 and receiver 25 off during all other payload time slots.

Content Option 2 (C2)

The OLT sends a schedule of the same form as the schedule in C1, but with duration times for some or all time slots chosen such as to let the time slots overlap each other. In accordance with the issued schedule, at the start time of any time slot, the OLT either starts transmitting payload addressed to the ONU to which the new time slot is assigned, or continues transmitting payload for the ONU to which it had been transmitting immediately before this moment. The ONU responds to the overlapping schedules by starting to receive at every start time assigned to it. It continues receiving until the end of its assigned time slot or until it receives the first packet with a destination address other than its own.

The ONU reception control method of C2 is beneficial when compared to that of C1, in that it allows the OLT to issue only tentative schedules that can be changed on the fly, depending on the current status of the payload queued for downstream transmission.

Content Option 3 (C3)

The OLT sends a schedule consisting only of the reception start times for each ONU. The information about the duration of the reception is omitted. The ONU starts receiving at every start time assigned to it, like in C2, and stops receiving when it receives the first packet with a destination address other than its own.

Content Option 4 (C4)

The OLT sets periodic turn-on times for each ONU, by specifying the initial reception start time and the period of repetition of the reception start time. Further operation is identical to that described for C3.

It will be apparent to those familiar with EPON/GPON operation, that C2, C3 and C4 allow some flexibility in terms of downstream bandwidth allocation and last-moment traffic shaping, introducing only negligible traffic delay and virtually no schedule-related bandwidth loss compared to the unscheduled downstream traffic in original GPON and EPON standards. For example, if each GPON ONU is assigned 10 turn-on times in the downstream frame period of 125 μs then, in the worst case, a payload unit destined to that ONU may be delayed by 12.5 μs, which is typically less than packet buffering delay in the OLT. This delay can be further reduced by assigning ONUs more frequent turn-on times.

FEC and Payload Alignment for C1, C2, C3 and C4.

There may be provided a set of "soft time slot boundary" ONU synchronization rules that are equally applicable to methods C1, C2, C3 and C4.

Rule R1—Applicable when Downstream FEC is Used.

Rule 1 (R1) specifies that the OLT shall not shorten FEC codewords at a time slot start time, but run full-size FEC codewords which, in the general case, will straddle the time slot start time. Assuming that ONU_2 is supposed to start receiving at time slot start time Ts_2 and that some other ONU, say ONU_1, has been receiving in the previous time slot, the FEC codeword Fs_1 straddling Ts_2 shall not contain payload sent to ONU_2. ONU_2 will effectively start looking for its own payload starting from the beginning of the following FEC codeword Fs_2, as will be shown with reference to FIG. 4 and FIG. 5.

Figure 4:
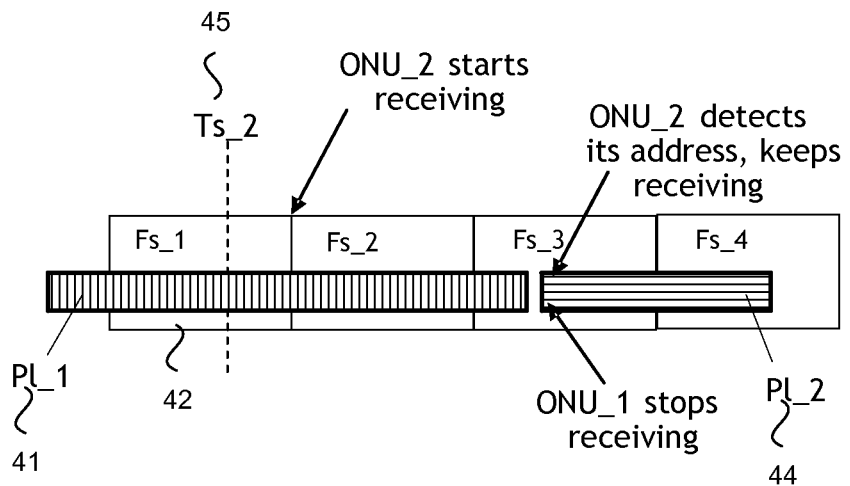
FIG. 4 illustrates payload processing in an EPON applying a first rule.
Figure 5:
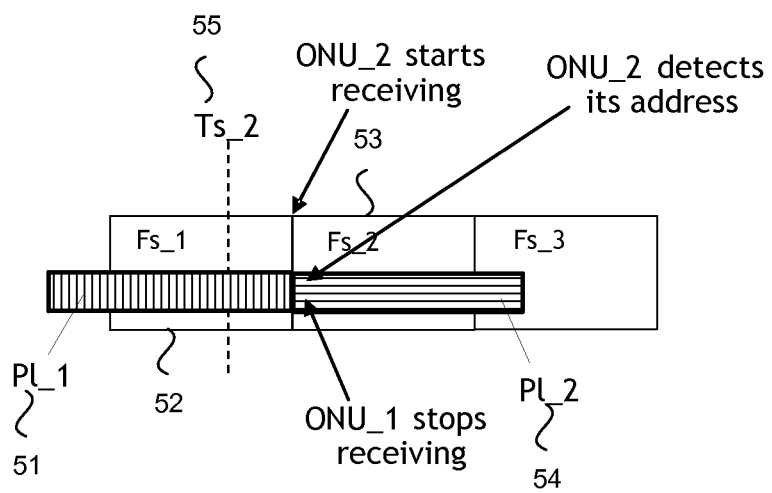
FIG. 5 illustrates payload processing in a GPON applying a first rule.

Rule R1.1—Applicable to EPON Family of Standards:

With reference to FIG. 4, if a payload unit Pl_1 41 (Ethernet frame in this case) sent to ONU_1 in Fs_1 42 does not end in Fs_1 42, ONU_1 shall keep receiving as many subsequent FEC codewords as necessary to receive the complete payload unit. During the same time, ONU_2 shall stay tuned and wait until it receives the beginning of the next payload unit Pl_2 44 and reads its address field. Due to the use of self-synchronous scrambling in 10G EPON, a 10G EPON ONU_2 shall turn on its data recovery and descrambling units long enough before Ts_2 45 in order for the descrambler to achieve synchronization with the upstream communications from the OLT.

Rule R1.2—Applicable to GPON Family of Standards:

In a GPON case (FIG. 5) the last payload unit Pl_1 51 (GEM frame in this case) sent in Fs_1 52, must end in Fs_1 52 which straddles Ts_2 55. It is the responsibility of the OLT to ensure this by means of fragmentation. Fs_2 53 must start with a valid GEM header. By starting to receive at the beginning of Fs_2 53, ONU_2 achieves both FEC and payload (GEM) alignment.

The ways by which GPON and EPON-type ONUs achieve and maintain FEC alignment are well known and defined in their respective standards. These ways include locking to the beginning of the downstream frame (GPON), alignment to sync characters (EPON) as well as counting FEC codewords (GPON and EPON).

Rule R2—Applicable when Downstream FEC is Not Used

Figure 6:
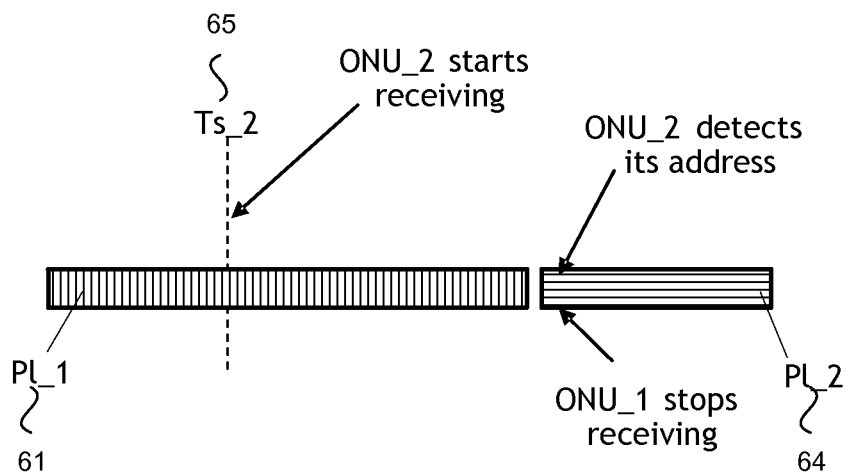
FIG. 6 illustrates payload timing in an EPON applying a second rule.

Rule 2.1—Applicable to EPON Family of Standards:

In an EPON system where FEC is not used as shown in FIG. 6, the OLT is allowed to transmit a downstream Ethernet frame Pl_1 61 to ONU_1, such that it crosses Ts_2 65. ONU_2 starts processing downstream traffic at Ts_2 65, looking for the beginning of the first frame of Pl_2 64 starting after Ts_2 65. To synchronize to the newly arriving frame, the ONU uses line code and "start" per standards 802.3ah and 802.3av, in EPON and 10G EPON, respectively. Due to the use of self-synchronous scrambling in 10G EPON, a 10G EPON ONU_2 shall turn on its data recovery and descrambling units long enough before Ts_2 65 in order for the descrambler to achieve synchronization.

Figure 7:
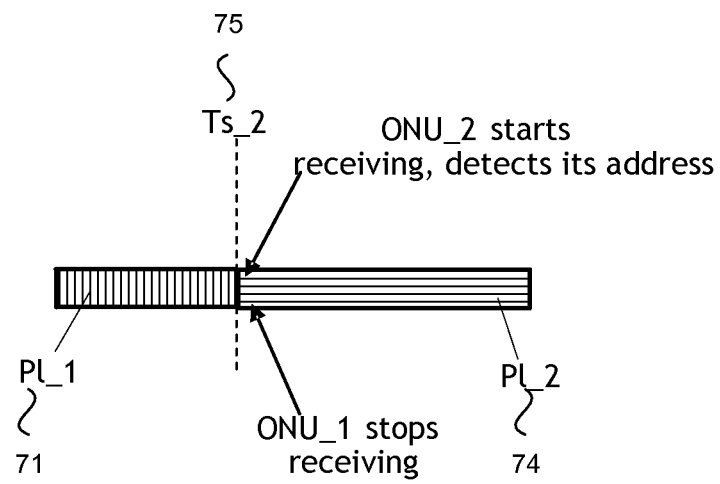
FIG. 7 illustrates payload timing in a GPON applying a second rule.

Rule 2.2—Applicable to GPON Family of Standards:

The GPON case for Rule 2 is shown in FIG. 7. In this scenario, the OLT is not allowed to generate a downstream GEM frame Pl_1 71 crossing Ts_2 75. To ensure this, the OLT applies packet fragmentation. The OLT generates the next valid GEM frame Pl_2 75 (or idle GEM header) starting exactly at Ts_2 75. ONU_2 achieves GEM frame synchronization by starting to receive at Ts_2 75, treating the first (5 for GPON, 8 for 10GPON) received bytes as the GEM header.

The corresponding operation of GPON and EPON OLT and ONUs is illustrated in FIGS. 8 to 11. For an EPON OLT implementing rules R1 or R2, the operation is as shown in the flowchart 200 of FIG. 8. At step 201, the OLT hardware determines if the start of a frame is encountered. If so, Message Point Control Protocol (MPCP) messages are sent 202, but otherwise, the operation proceeds to decision tree 203 to determine if the downstream ONU is to be changed, in which case, the currently selected ONU, identified as the field ONU_ID_TX is updated with the next ONU in the ds schedule (step 204). If the whole Ethernet frame has been sent, as determined at step 205, then the process returns to step 201. Otherwise, the payload is sent with the appropriate ONU indicated in the ONU_ID_tx field (step 206). If a time slot start has been reached, as determined at step 207, then the process returns to step 201. Otherwise, the process returns to step 205 to determine if the whole Ethernet frame has been sent.

Figure 9:
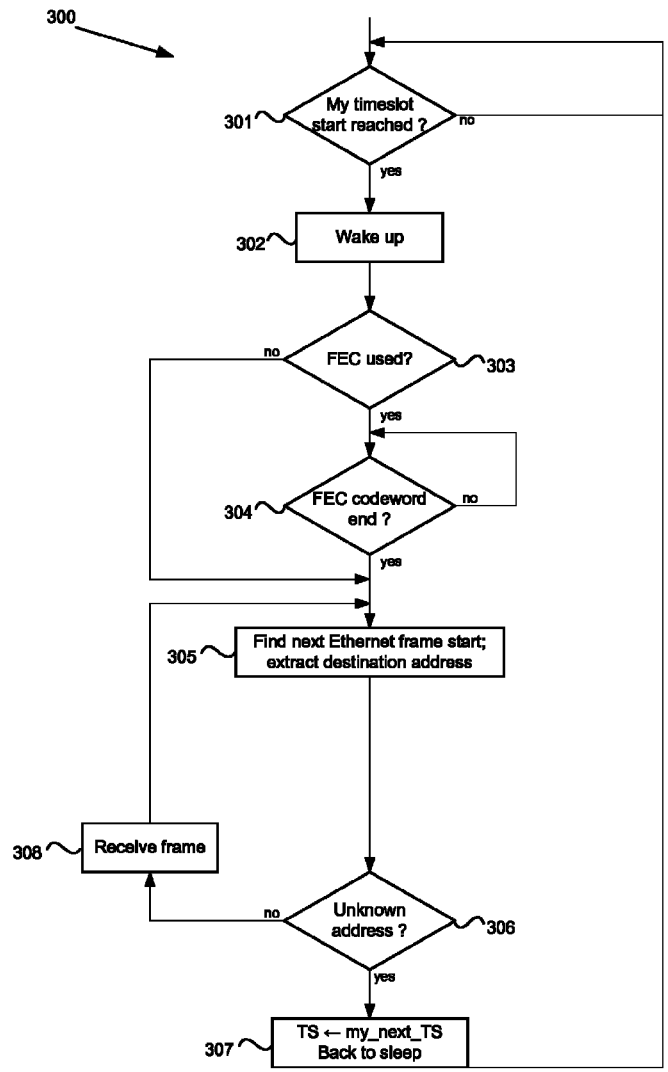
FIG. 9 illustrates a process for ONU operation in an EPON applying the first or second rules.

The corresponding EPON ONU operation may be as shown in the flowchart 300 of FIG. 9. At step 301, an ONU determines if its timeslot has been reached, and wakes up the ONU components (step 302) to begin receiving and processing received data. Otherwise, the process cycles at step 301 until the timeslot has been reached. Once the ONU wakes up, then, if no FEC codeword is used (step 303), the process may proceed direct to step 305. If FEC is being used, then the ONU processes received packets until the end of the FEC codeword (step 304). At step 305, the ONU finds the start of the next Ethernet frame and extracts the destination address. If the address is unknown, as determined at step 306, then the ONU returns to the sleep mode (step 307) and operation returns to step 301. However, if the address is the address of the ONU, then the ONU receives the frame (step 308) and returns to step 305 to continue receiving frames until an unknown address field is detected.

Figure 8:
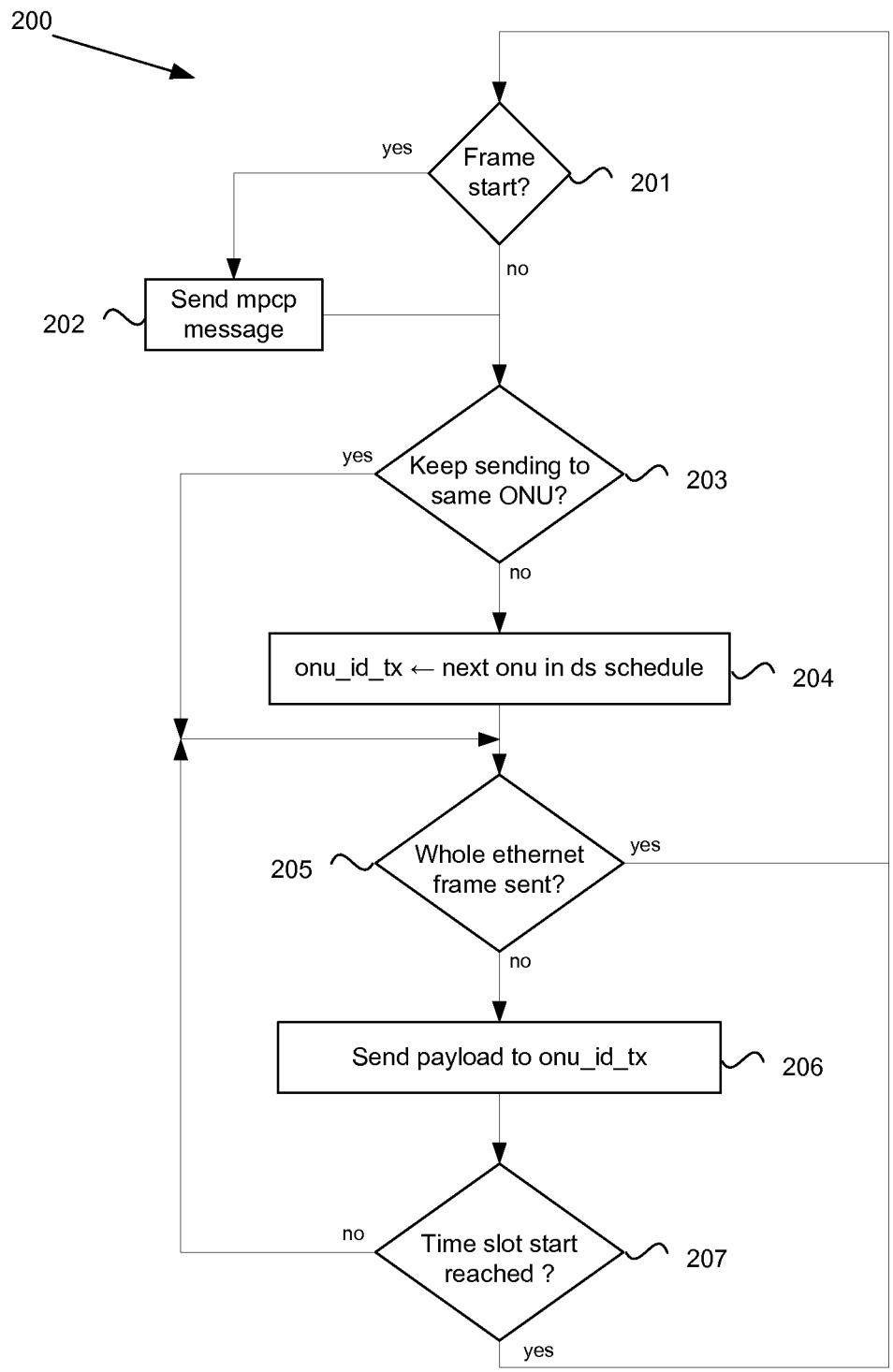
FIG. 8 illustrates a process for OLT transmission in an EPON applying the first or second rules.
Figure 10:
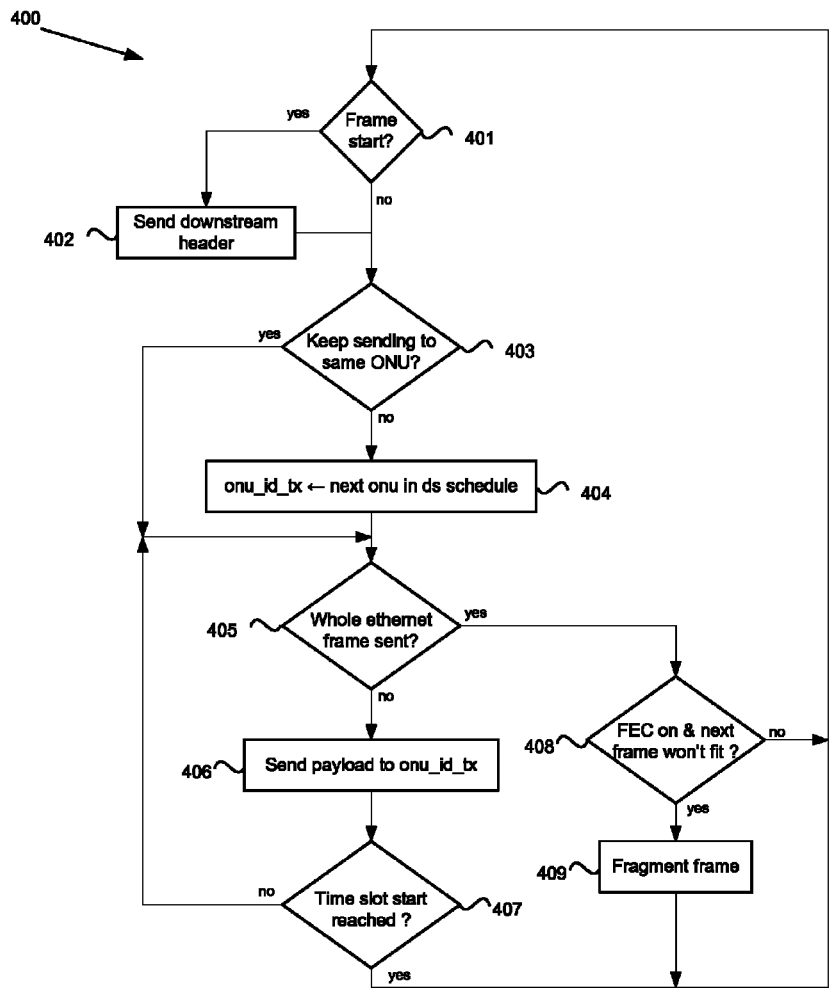
FIG. 10 illustrates a process for OLT transmission in a GPON applying the first or second rules.

The operation of the OLT for a GPON system implementing rules R1 or R2, shown in the flowchart 400 of FIG. 10, is similar to the EPON OLT operation of FIG. 8 but with additional steps for fragmenting a GEM frame if required. At step 401, the OLT hardware determines if the start of a frame is encountered. If so, a downstream header is sent (step 402), but otherwise, the operation proceeds to decision tree 403 to determine if the downstream ONU is to be changed. If necessary, the field value of the field ONU_ID_tx is updated with the next ONU in the ds schedule (step 404). At step 405, the OLT determines if the whole GEM frame is sent. If not, then the OLT sends the payload downstream with the receiver ONU identified by ONU_ID_tx (step 406). If a time slot start has been reached, as determined at step 407, then the process returns to step 401. Otherwise, the process returns to step 405 to determine if the whole GEM frame has been sent. If decision 405 determines that the whole GEM frame has been sent, then at step 408, the OLT determines if the next GEM frame will fit within the time slot. If the frame will fit, then the process returns to step 401, otherwise, the next frame is fragmented at step 409 and then the process returns to step 401 for the fragmented frame.

Figure 11:
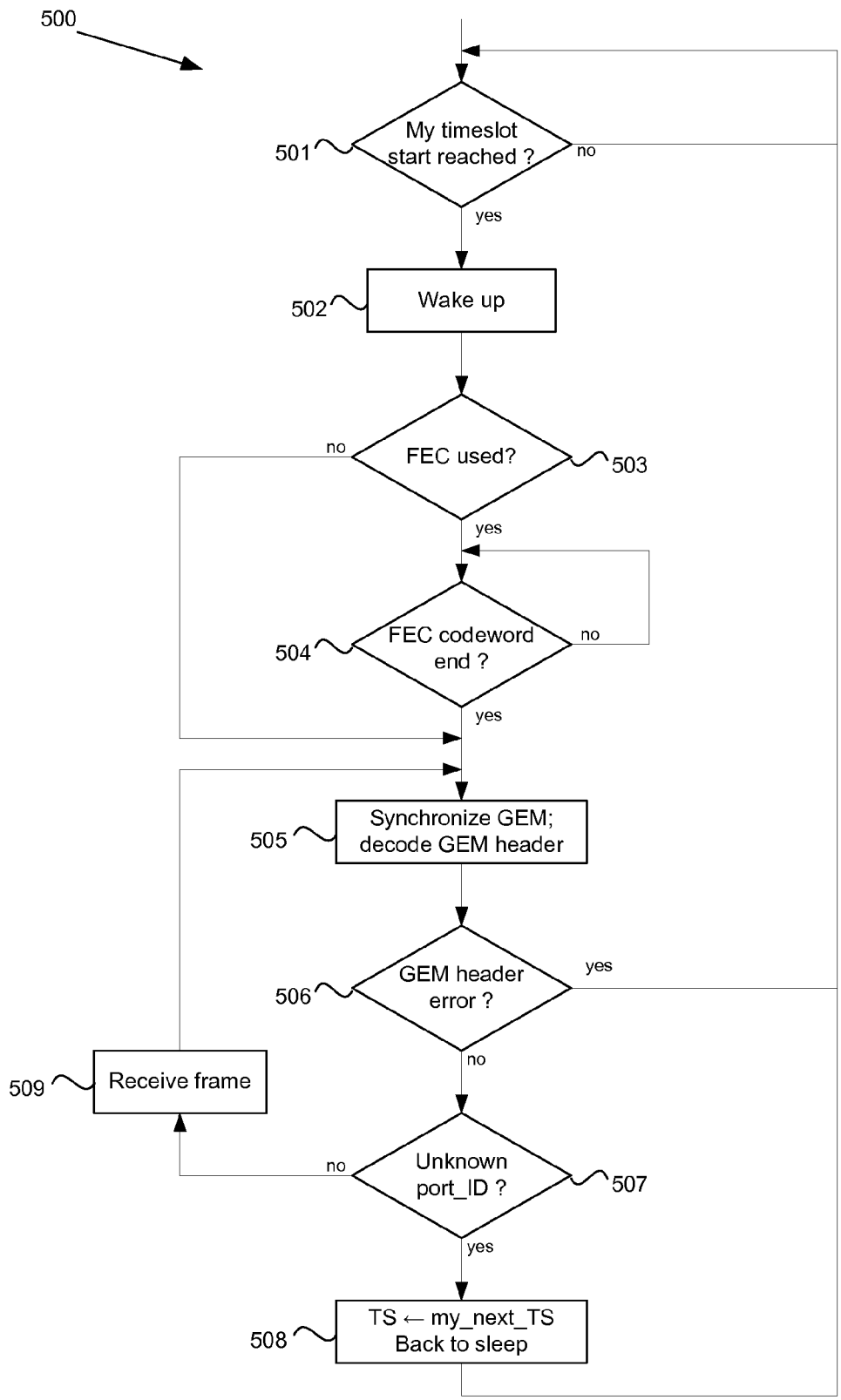
FIG. 11 illustrates a process for ONU operation in a GPON applying the first or second rules.

The corresponding GPON ONU operation may be as shown in the flowchart 500 of FIG. 11. At step 501, a GPON ONU determines that if its timeslot has been reached, it wakes up the ONU components (step 502) to begin receiving and processing received data. Otherwise, the process cycles at step 501 until the timeslot is reached. Once the ONU wakes up, then, if no FEC codeword is used (step 503), the process may proceed direct to step 505. If FEC is being used, then the ONU ignores received packets until the end of the FEC codeword (step 504). At step 505, the ONU synchronizes the GEM and decodes the GEM header. If a header error is encountered at step 506 or if the GEM header contains an unknown port_ID (step 507), then the ONU returns to a sleep mode 508 and processing returns to step 501. Otherwise, the ONU receives and processes the frame (step 509) and returns to step 505 to continue receiving frames until an unknown port_ID is encountered, which may occur, for example, in the timeslot of the next scheduled ONU.

For an EPON-type protocol with downstream FEC, the R1-R1.1 rule combination applies; for a EPON-type protocol without downstream FEC, the R2-R2.1 rule combination applies; for a GPON-type protocol with FEC, the R1-R1.2 rule combination applies; for a GPON-type protocol without FEC, the R2-R2.2 rule combination applies. Using these combinations of rules as appropriate, it will be apparent to the skilled addressee familiar with EPON/GPON protocols, that FEC and payload synchronization would not disrupt the operation of standard EPON or GPON ONUs which do not have the energy saving feature and receive downstream traffic continuously. Therefore, an advantage of the "soft time slot boundary" rules is in that it provides backward compatibility with legacy ONUs.

In an alternative embodiment, a PON system designer may choose to forfeit the benefit of backward compatibility, in favor of simpler ONU operation. In such an embodiment, a rule R3 may be used in combination with the content options C1, C2, C3 and C4 described above. According to this rule, the time slot start times are used as hard time slot boundaries.

Rule R3—Applicable when Downstream FEC is Used.

In this rule, the OLT shortens the last FEC codeword prior to the next time slot start time, to ensure that it does not straddle Ts_2. The OLT then starts a new FEC codeword at Ts_2. ONU_1 is configured to be aware of the FEC codeword shortening (based on the information from C1, C2, C3 or C4) and adjust its FEC decoder accordingly. ONU_2 starts processing downstream traffic at Ts_2 and decodes the FEC codeword starting at that time. ONU_2 effectively starts looking for its own payload starting from the beginning of the following FEC codeword Fs_2.

The choice of content option C1, C2, C3 or C4 determines whether the OLT can continue sending payload to ONU_1 after Ts_2. If that is the case, ONU_1 keeps receiving until the reception of the first payload unit that doesn't belong to it.

Figure 12:
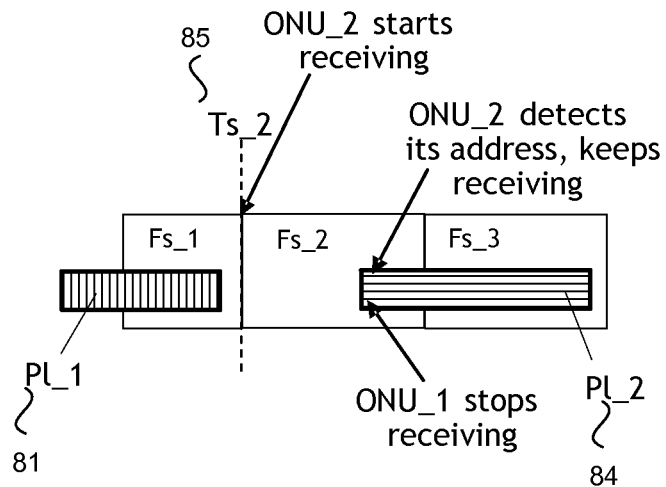
FIG. 12 illustrates payload processing in an EPON applying a third rule.

Rule R3.1—Applicable to EPON Family of Standards:

As shown in FIG. 12, the OLT does not start sending an Ethernet frame to ONU_1, that would have to straddle the Ts_2 boundary 85. Thus payload Pl_1 81 to ONU_1 terminates before Ts_2 85 and payload Pl_2 84 to ONU_2 commences after Ts_2 85.

Figure 13:
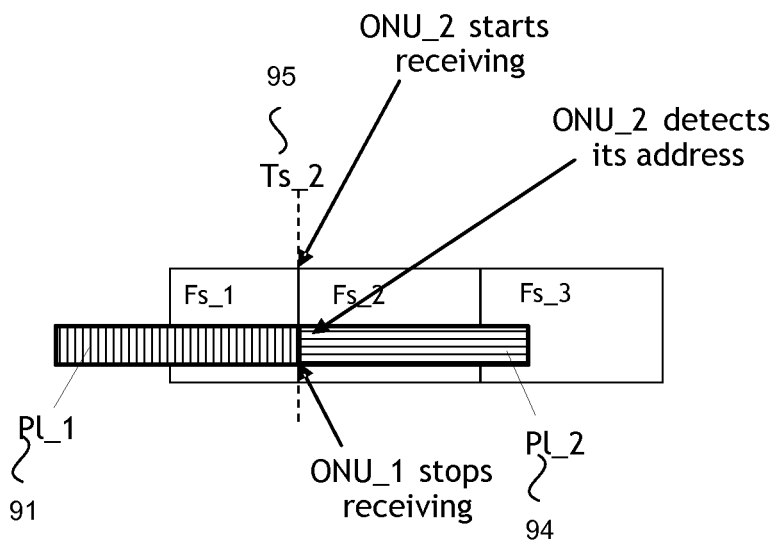
FIG. 13 illustrates payload processing in a GPON applying a third rule.

Rule R3.2—Applicable to GPON Family of Standards:

As shown in FIG. 13, the OLT fragments the ONU_1 bound payload 91 such as to ensure that no GEM frame straddles the Ts_2 boundary 95. ONU_2 thus detects its address immediately at the start of the frame Fs_2 corresponding to when ONU_2 is woken from sleep mode and is ready to start receiving payload Pl_2 94.

The benefit of applying Rule R3 is in that ONUs do not have to maintain FEC synchronization while not processing downstream traffic, which further decreases their energy consumption in the energy-saving mode of operation.

Figure 14:
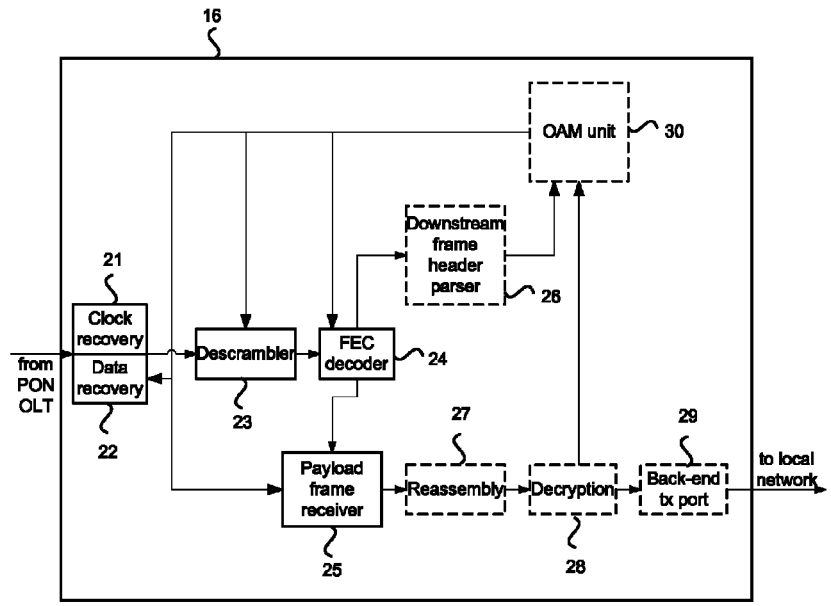
FIG. 14 illustrates a modified ONU.

In various embodiments, including embodiments applicable to GPON, the IPTT may be contained in the downstream frame header. A modified ONU 140, as shown in FIG. 14, may include an OAM unit 30 configured to process the IPTT. The IPTT is first received and processed by the Downstream Frame Header Parser 26, whose functionality is modified to accommodate IPTT processing. The IPTT is then passed to the OAM unit 30. In the case when the IPTT is sent as part of an OAM message that has the same format as the payload units (like MPCP messages in EPON i.e. OMCI messages in GPON), such messages flow through the same path as the payload messages, but instead of being passed to the back-end Tx port 29, they are passed to the OAM unit 30. The OAM 30 acts on the IPTT information to place the data recovery 22, descrambler 23, FEC decoder 24 and payload frame receiver 25, in the low power mode based on the received IPTT.

IPTT Format Options

For EPON family of standards, MPCP-type messages may be used to communicate IPTT. However, for GPON standards, multiple formats are available.

A first option for IPTT in a GPON network would be to extend the downstream frame header to include the IPTT field, similar to the upstream bandwidth map. This format option would allow frequent updates and would be convenient for communicating either C1, C2, C3 or C4-type of content.

Figure 15:
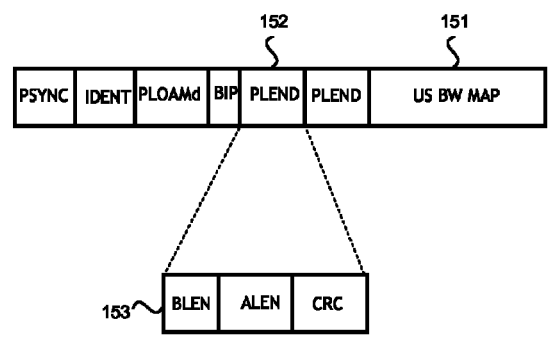
FIG. 15 illustrates a downstream frame header.
Figure 16:
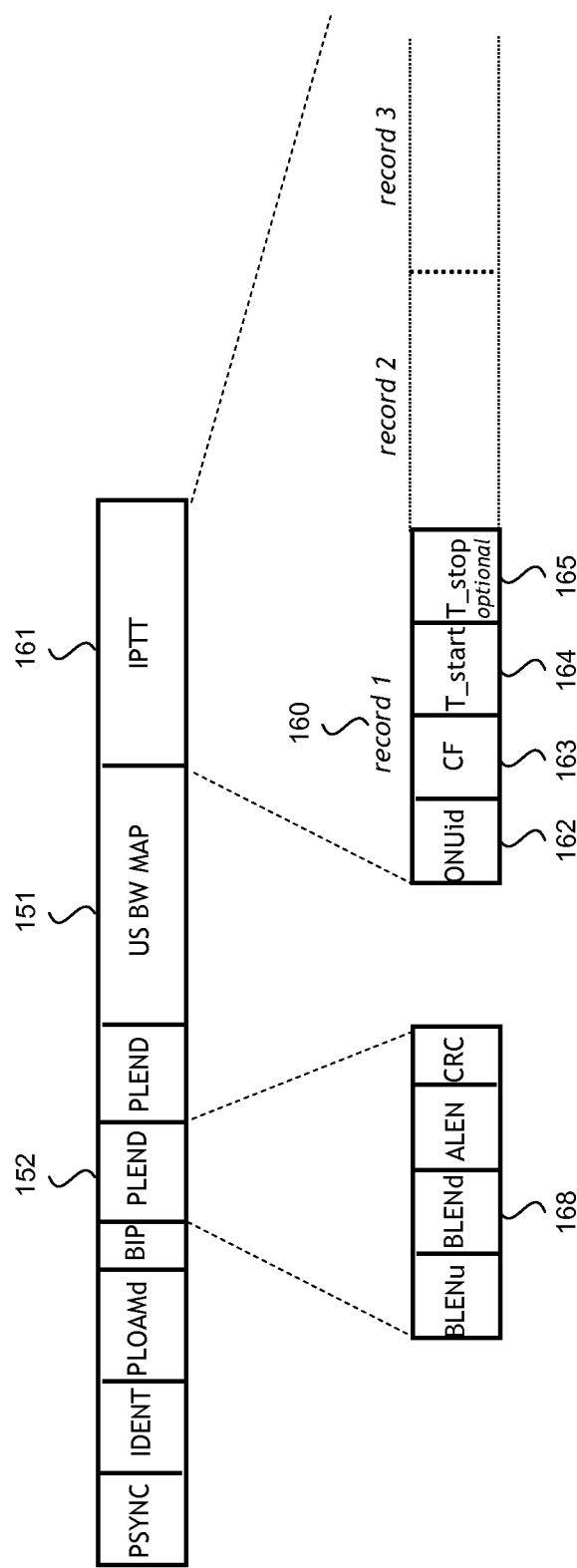
FIG. 16 illustrates a downstream frame header modified to receive information about payload transmission times.

The structure of the standard downstream GPON frame header per ITU-T G.984.3 is shown in FIG. 15. Given that the length of the upstream bandwidth map (US BW MAP) 151 field is generally variable, the US BW MAP is preceded by the PLEN field 152 (sent twice) which contains the information 153 about the length of the US BW MAP field 151. This enables the receiving ONUs to parse the frame header properly and synchronize to the beginning of the payload section following the downstream header. One possible way to include IPTT in the GPON downstream header is to append the IPTT field at its end, immediately following the US BW MAP field 151. This is illustrated in FIG. 16. Given that the length of the IPTT field 168 may also be variable, the PLEN field 152 is modified such as to include the length 168 of the IPTT field 161, as also shown in FIG. 16. This PLEN modification may be necessary to preserve the ONU synchronization mechanism.

FIG. 16 further shows one possible format of the IPTT field, whereby the IPTT is made up of a sequence of records 160 each one consisting of: the ONU ID 162, optional command flag (CF) 163, reception start time 164 and, for content options C1 and C2, also the reception stop time 165.

The command flag 163, if used, indicates whether the specified ONU should add or remove the particular reception time from its list of reception times. Alternatively, if the command flag is not used in the IPTT record, the new reception times specified in the current IPTT record replace all previously assigned reception times.

In order to properly receive the modified downstream header frame, the functionality of the downstream frame header parser 26 in the ONU may be modified to use the new structure of the PLEN field, thus extracting the IPTT field and passing its contents to the OAM unit 30.

A second IPTT format option would be a new Physical Layer Operations And Maintenance (PLOAM) message, where a separate PLOAM message would be sent to each of the ONUs for any type of C1-C4 content, or a broadcast PLOAM message for C4 with all ONUs assigned the same, periodic time slot start times. The convenience of this option is in its backward compatibility with legacy ONUs, which would simply ignore this PLOAM message type as unknown or bad. Also, this type of IPTT messaging would introduce a minimum bandwidth penalty.

Similarly to the IPTT format shown in FIG. 16, the IPTT format inside this PLOAM frame can consist of one or more records, each one including the reception start time, command flag and an optional stop time. It would not be necessary to include the ONU ID in each record given that it is already specified in the PLOAM message header. Also, given the small size of PLOAM messages and the low frequency of their transmission, a format using the command flags may be more beneficial than the one omitting them.

In order to receive this format of IPTT messaging, the functionality of the ONU OAM unit may be extended such as to recognize the additional type of PLOAM message and extract the IPTT contents from it.

A third IPTT format option uses ONU Management Control Interface (OMCI) messaging, which has the same advantages of PLOAM messaging, but also provides full transparency of IPTT messages to the legacy ONUs which do not support the energy saving operation. In the case of PLOAM and OMCI IPTT messaging for GPON, the last message would be enforced until an overriding message is issued.

The IPTT format inside the OMCI message can be similar to the to the IPTT format shown in FIG. 16, consisting of one or more records, each one including the reception start time, optional command flag and an optional stop time. It should not be necessary to include the ONU ID in each record given that it is already specified or implied in the header of the OMCI message. If the command flags are used, they should indicate for the reception time in each record, whether it is added or removed from the list of reception times of the receiving ONU. For a format without the command flags, each OMCI message may contain a complete new list of the reception times for the receiving ONU.

In order to receive IPTT encapsulated in an OMCI message, the functionality of the ONU OAM unit should be extended such as to recognize the additional type of OMCI message and extract the IPTT contents from it.

Processing of the IPTT contents by the ONU and its use by the ONU in order to decrease its energy consumption should generally be the same regardless of the format in which the IPTT is delivered. The OAM unit of any ONU capable of IPTT processing may include a table storing the list of updated reception times assigned to this ONU. The ONU starts receiving downstream traffic whenever the state of its downstream frame byte counter matches one of the start times stored in this table.

Reception of downstream frame headers may not be controlled by IPTT, instead, each ONU may receive and process each downstream frame header. A newly registered ONU that has not yet received the IPTT, can be configured to either receive complete downstream frame payload or, if the IPTT is embedded in the downstream frame header (IPTT field or IPTT PLOAM), not to receive any downstream payload before receiving IPTT.

IPTT Time Reference

Time references for EPON and GPON families of standards are different. EPON features a 32-bit "timestamp" counter that is synchronized between the ONU and OLT, which may also be used as time reference for IPTT. In GPON, the time reference is local to each downstream frame and is expressed as the byte offset from the beginning of the frame. This same time reference may be used for IPTT in GPON.

As will be apparent from the foregoing, the systems described herein can improve the ONU energy-efficiency of the 10GPON and 10G EPON system that are under development and also of the GPON systems that are currently being deployed. The benefits for the end user include the ONU's longer battery life during power outages as well as in the lower electricity bills associated with the ONU operation. Advantageously, the systems described herein would be more likely to meet future energy-efficiency and "carbon footprint" regulations.

Although embodiments of the present invention have been illustrated in the accompanying drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A passive optical network, comprising:
   at least one optical line termination; and
   a plurality of optical network units in communication with the at least one optical line termination;
   wherein the at least one optical line termination is configured to:
      communicate a transmission schedule to the plurality of optical network units; and
      transmit payloads to the plurality of optical network units in accordance with the transmission schedule;
   wherein at least one of the plurality of optical network units is configured to:
      receive the transmission schedule from the at least one optical line termination; and
      operate in a low power mode during periods indicated in the transmission schedule during which the respective optical network unit is not scheduled to receive payload transmission;
   wherein a first optical network unit of the plurality of optical network units is configured to:
      switch from the low power mode to operate in a receiving mode from a start time of a first transmission time slot allocated to the first optical network unit; and
      receive a payload transmission addressed to the first optical network unit during the first transmission time slot.

2. The passive optical network according to claim 1 wherein the at least one of the plurality of optical network units comprises a plurality of payload processing components that process payloads addressed to other of the plurality of optical network units and wherein the at least one of the plurality of optical network units is configured to operate in a low power mode by placing one or more of the plurality of components into a reduced power state.

3. The passive optical network according to claim 1 wherein the transmission schedule comprises a plurality of start times allocated for payload transmission addressed to individual ones of the plurality of optical network units.

4. The passive optical network according to claim 3 wherein the transmission schedule comprises information indicating a duration time of a plurality of transmission time slots allocated to individual ones of the plurality of optical network units.

5. The passive optical network according to claim 3 wherein a first optical network unit of the plurality of optical network units is configured to switch from the low power mode to a processing state for a period prior to a start time of a time slot allocated to the first optical network unit and to synchronize the first optical network unit to the at least one optical line termination during the period.

6. The passive optical network according to claim 1 wherein the transmission schedule comprises a plurality of transmission time slots allocated to individual ones of the plurality of optical network units and wherein one or more of the plurality of transmission time slots overlap.

7. The passive optical network according to claim 6 wherein the first optical network unit of the plurality of optical network units is further configured to:
   continue operating in the receiving mode until the earlier of the end of the first transmission time slot or receipt by the first optical network unit of a first packet addressed to an optical network unit other than the first optical network unit; and thereafter return to the low power mode.

8. The passive optical network according to claim 1 wherein the transmission schedule comprises at least one initial start time of a time slot for payload transmission to an individual one of the plurality of optical network units and a period of repetition of the time slot.

9. The passive optical network according to claim 1 wherein the at least one optical line termination is configured to communicate the transmission schedule to the at least one optical network unit in an extended downstream frame header.

10. The passive optical network according to claim 1 wherein the at least one optical line termination is configured to communicate the transmission schedule to the at least one of the plurality of optical network units in a Physical Layer Operations And Maintenance message.

11. The passive optical network according to claim 1 wherein the at least one optical line termination is configured to communicate the transmission schedule to the at least one optical network units in an ONU Management Control Interface message.

* * * * *